Patented Oct. 3, 1922.

1,431,080

UNITED STATES PATENT OFFICE.

GEORGE WILSON ACHESON, OF NEWARK, NEW JERSEY, ASSIGNOR TO ACHESON CORPORATION, OF NEW YORK, N. Y., A CORPORATION OF DELAWARE.

METHOD OF PREPARING VARNISHES.

No Drawing.     Application filed August 7, 1922.   Serial No. 580,282.

*To all whom it may concern:*

Be it known that I, GEORGE WILSON ACHESON, a citizen of the United States, residing at Newark, in the county of Essex and State of New Jersey, have invented certain new and useful Improvements in Methods of Preparing Varnishes, of which the following is a specification.

This invention is a novel method applicable to the preparation of varnishes, presenting the advantages that temperatures substantially above those of boiling water are not required at any stage, and that after the initial operation of dissolving the resin temperatures substantially above normal need not be employed.

I prefer to employ as the principal components of my varnish clear rosin or Congo gum in a vehicle comprising wood oil or linseed oil, or mixtures of these. My invention is not restricted however to these particular materials. I prefer to proceed as follows:

The rosin or Congo gum is crushed and added to water, together with sufficient ammonia to yield a clear solution. In the case of rosin heating is not necessary at this stage, but when using Congo gum the mixture is boiled, preferably under a reflux condenser, until a clear solution results. The proportion of water used is not important provided it be sufficient, when rendered distinctly ammoniacal, to dissolve the resin. I then boil the solution, with gradual expulsion of the ammonia, until the liquid becomes milky, indicating a separation of a portion of the resin in a state of colloidal suspension.

I next emulsify wood oil or boiled linseed oil by thorough stirring at ordinary or somewhat higher temperatures with an aqueous solution of ammonia, the latter sufficient to impart a distinct ammoniacal odor to the emulsion.

I thereupon mix the resin and oil emulsions, and add to the mixture with thorough stirring a small quantity of an electrolyte, such as alum, hydrochloric acid or the like. The effect of such addition is to cause the separation of a somewhat curd-like precipitate or coagulum which is readily separated from the water, and may be dried at moderate temperatures, as by passing through steam-heated rolls. This coagulum comprises the oily and resinous components of the mixture, and constitutes a stock material which may be thinned with turpentine or other suitable vehicle for preparation of the varnish. As will be noted, the bulk of the water originally used is separated and rejected without the necessity of resorting to evaporation, which fact allows great latitude in the amount of water employed in the preparation of the initial clear solution. In some cases I have used acetone as the solvent for the resin-oil precipitate, obtaining therewith a clear, colorless and quick-drying varnish. When acetone is used it is not essential that the precipitate be dried prior to its solution, since any residual water will separate from the clear varnish.

The procedure described above yields a clear varnish, but it will be understood that pigments or dyes may be introduced as desired. When pigments are to be added I prefer to subject them to a preparatory treatment by deflocculation, as more fully disclosed in a copending application filed herewith, Serial No. 580,281; and to introduce the deflocculated suspension into the oil-resin emulsion before the flocculation or coagulation of the latter.

My invention is not limited to the manipulations as described above, although the procedure as described is that which I now prefer to use. A modified procedure which may be regarded in most cases as equivalent to that which I have described, consists in emulsifying the oil directly in the resin suspension, instead of in a separate menstruum as described.

I claim:

1. Method of making a varnish stock, comprising preparing a mixture including a colloidal suspension of a resin and an emulsified oil in an aqueous menstruum; simultaneously precipitating the resinous and oily components by means of an electrolyte; and recovering the precipitate from the excess water.

2. Method of making a varnish stock, comprising preparing a colloidal suspension of a resin in an aqueous menstruum; mixing therewith an emulsified oil; simultaneously precipitating the resinous and oily components by means of an electrolyte; and recovering the precipitate from the excess water.

3. Method of making a varnish stock containing a pigment material, comprising preparing a mixture including a coloidal suspension of a resin, an emulsified oil and a deflocculated pigment, in an aqueous menstruum; simultaneously precipitating the resinous, oily and pigment components by means of an electrolyte; and recovering the precipitate from the excess water.

In testimony whereof, I affix my signature.

GEORGE WILSON ACHESON.